United States Patent [15] 3,672,604

Beaumont [45] June 27, 1972

[54] TAPE CARTRIDGE INCLUDING DIRECT VIEWING OF CUE INDICIA

[72] Inventor: Alan Beaumont, 359 Wildwood Road, Stamford, Conn. 06903

[22] Filed: Oct. 8, 1970

[21] Appl. No.: 79,189

[52] U.S. Cl. ..............................................242/199, 40/86 A

[51] Int. Cl. .................G03b 1/04, G11b 15/32, G11b 23/04

[58] Field of Search .........................242/186–190, 197–200, 242/210; 250/219 Q, 219 QA, 219 FR; 179/100.2 S, 100.2 Z; 40/28 B, 86 A; 352/129, 170–172; 353/98, 99

[56] References Cited

UNITED STATES PATENTS

| | | | |
|---|---|---|---|
| 2,905,050 | 9/1959 | Castedello et al | 352/129 X |
| 3,296,926 | 1/1967 | Kapilow | 352/129 X |
| 2,952,416 | 9/1960 | Sampson | 242/188 |
| 2,988,295 | 6/1961 | Loewe | 242/199 |

*Primary Examiner*—Leonard D. Christian
*Attorney*—Colton and Stone

[57] ABSTRACT

Cue indicia applied to the non-recording surface of a magnetic tape are directly viewed by passing the non-recording tape surface across a tape guiding element which includes a mirror for viewing the non-recording surface.

11 Claims, 4 Drawing Figures

INVENTOR
ALAN BEAUMONT

BY Colton & Stone
ATTORNEYS.

TAPE CARTRIDGE INCLUDING DIRECT VIEWING OF CUE INDICIA

BACKGROUND OF THE INVENTION

Magnetic tape cartridges of the "cassette" type enjoyed instant success upon their introduction in 1963 and, in the ensuing years, have created one of the largest and fastest growing electronics industries in the world. The compact unit-handled characteristic of these cartridges coupled with their excellent audio reproduction qualities and capability of being concomitantly erased and re-recorded makes them ideally suited for such diverse uses as entertainment, education, business communications and the like. A typical cartridge tape may include a double track system whereby the full tape length may be played or recorded along one-half the tape width in one direction after which time the cartridge may be reversed and the remaining half tape width played or recorded as the tape is moved in the other direction between selectively driven reels. Double track tapes of this type provide program lengths up to 90 minutes which, as will be apparent, may include a large number of separate recordings which are normally spaced by 10 second unrecorded, or audio pause, intervals when the tape is running at normal record or playback speed. The machines which play these tapes are provided with high speed forward and rewind controls for quickly advancing or rewinding a tape to the desired program selection and it is the fast and accurate location of the audio pause intervals immediately prior to selected ones of the plurality of recorded programs that comprises the subject matter of the invention.

Prior methods of locating audio pause intervals within the total length of recorded tape have included footage counting instrumentation requiring special equipment which is both expensive and impractical for use with "cassete" type cartridges; a relatively accurate but prohibitively expensive system of splicing colored pieces of plastic or paper into the tape reel; and the most common and least expensive but highly inaccurate system involving the placement of an index adjacent a viewing opening whereby the tape diameter may be estimated by visual comparison with the index. Because of the very high volume of "cassette" type cartridge sales and their relatively low selling cost it is apparent why the more inaccurate, less expensive indexing system is used with this type cartridge.

"Cassette" type cartridge tapes are transported between their selectively driven reels with the tape recording surface facing outwardly relative to the cartridge housing and reel axes so that the recording surface will be in position to engage the playback/record and erase heads as conventionally positioned in the playback and recording machines with which the cartridges are used. Consequently, the recording surface of the reeled tape faces outwardly and may be seen through the conventional viewing window as the tape is being reeled in either direction. Although the placement of cue or index markings, in the form of dye or paint marks or the like, on the recording surface during the non-recording audio pause intervals would provide an excellent method of enabling one to directly view these cue markings for the determination of a particular selection along the tape length; the presence of such markings on the recording surface would render the tape unusable for subsequent recordings since such markings could not be erased. Inasmuch as the great majority of cartridge tape sales are destined to be used for multiple erasures and recordings it is apparent that the presence of cue markings on the originally recorded surface is an impractical approach to the problem.

SUMMARY OF THE INVENTION

The invention resides in the positionment of a mirror or mirrors within the otherwise conventional "cassette" type cartridge housing in such a manner that the non-recording surface of a magnetic tape may be directly viewed through the conventional viewing window or opening. The purpose of the construction is to enable one to view cue or index markings applied to the non-recording surface of the tape even though this surface is normally obscured from view through the conventional viewing opening since this opening exposes only that tape wound on the reels rather than the intermediate run of the tape between the reels.

The foregoing is achieved by the placement of a mirror containing tape guiding structure intermediate the reels and exposed to view through the viewing opening. The tape is threaded through the guiding structure with the non-recording surface thereof facing the mirror which reflects the non-recording surface thereof through the viewing opening. Consequently, as the tape is being transported at the relatively fast "rewind" or "fast forward" speed a viewer may observe a series of bright flashes in the mirror as a particular group of cue markings pass thereacross. Desirably, the cue markings will be color and/or numeral coded to identify particular selections. The mirror containing tape guiding structure is preferably associated with a particular one of the selectively driven reels and mounted for back and forth movement, intermediate the reels, as a consequence of the changing diameter of the associated reel; the movement of the guiding structure being constrained to that portion of the cartridge exposed by the viewing opening whereby the non-recorded surface of the tape may be viewed in the mirror at all times. In order to permit of different cue markings on each half width of the tape, to correspond with the separate recordings on a double track tape, the mirror takes the form of two mirror surfaces forming an angle of 90° whose angle bisector lies along the longitudinal axis of the tape whereby each mirror surface is positioned at 45° to the non-recording side of the tape to permit either half width thereof to be viewed through either of the conventionally opposed viewing openings on either side of the cartridge.

DESCRIPTION OF THE PREFERRED EMBODIMENT

Figure 1:
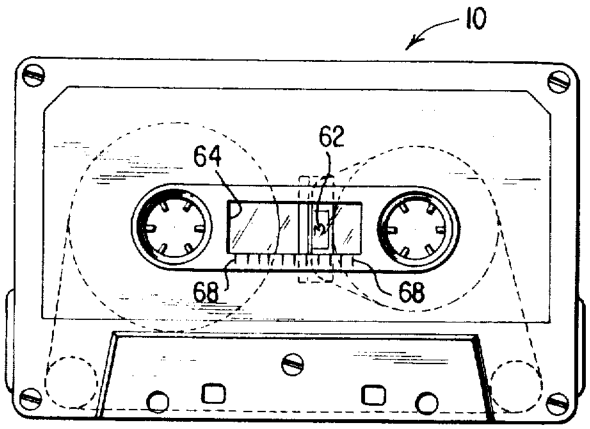
FIG. 1 is a plan view of a tape cartridge illustrating the direct viewing of cue markings applied to the non-recording surface of a magnetic tape.
Figure 2:
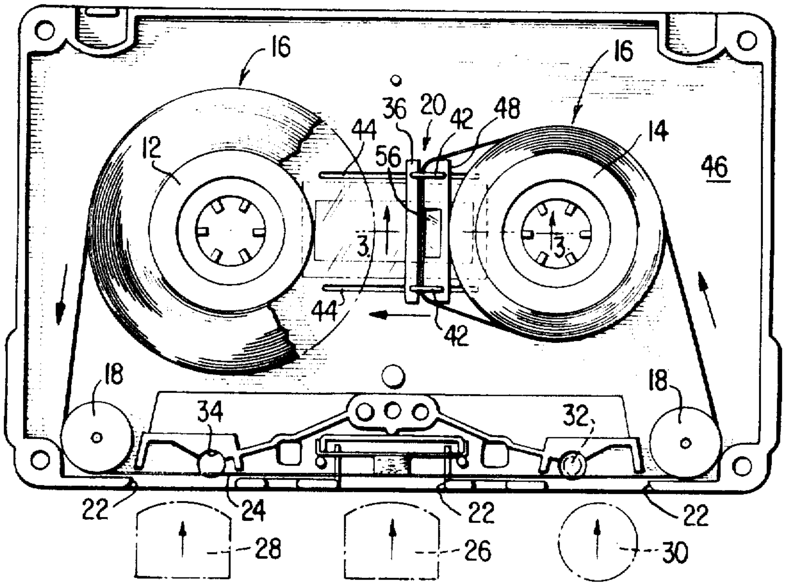
FIG. 2 is a view similar to FIG. 1 with the interior of the cartridge exposed and indicating, in phantom lines, associated mechanisms cooperative therewith.

A magnetic tape cartridge 10 of the "cassette" type includes selectively driven reels 12, 14 between which a magnetic tape 16 is adapted to be transported along a path of tape travel defined by idle pulleys 18 and a movably mounted, mirror containing guide structure 20 associated with reel 14. That portion of the tape path intermediate idlers 18 passes adjacent openings 22 formed in the lower cartridge wall to expose the recording surface 24 of tape 16 to the record/playback head 26, erase head 28 and a backing idler 30 which coacts with drive spindle 32 adapted to be received in either of openings 34 depending on which side of the tape is being played or recorded. It will be understood that drive spindle 32, in conjunction with backing idler 30, effects a friction drive for tape 16 in the record and playback modes while "rewind" and "fast forward" spindles, not shown, may be energized to selectively drive reels 12, 14 respectively at a much faster rate in either direction.

The path of tape travel from pay-out reel 12 to the point at which initial tape contact is made with the tape previously wound on take-up reel 14 is thus seen to be conventional and the deflection of the tape path at the mirror containing guide structure 20 intermediate the reels constitutes the only modification of an otherwise conventional cartridge structure.

Figure 3:
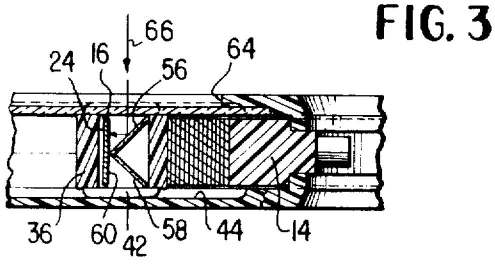
FIG. 3 is a section taken along the line 3—3 of FIG. 2 with a portion thereof further broken away for clarity of illustration.
Figure 4:
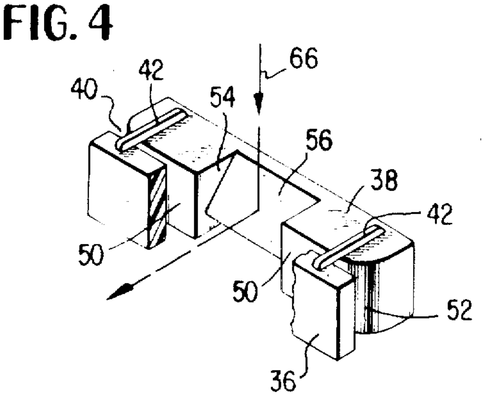
FIG. 4 is a broken perspective view of the mirror containing guide structure.

Guide structure 20 includes opposed block-like plastic elements 36, 38 interconnected in spaced relationship to define a magnetic tape receiving opening 40 therebetween by a pair of plastic slide elements 42. Slide elements 42, which may be molded integrally with plastic elements 36 and 38, bridge the opening 40 on either side thereof and perform the dual function of confining the tape within opening 40 and mounting the guide structure for back and forth movement intermediate reels 12, 14 in guide recesses 44 formed on the inner surfaces of the separable side walls 46 of cartridge 10. The larger block-like element 38 is adapted to have a rear flat surface 48 in engagement with the tape previously wound on take-up reel 14 while the opposite planar surface 50 thereof terminates at opposite ends in smoothly rounded surfaces 52 and is centrally interrupted by a recess 54. Perpendicularly related mirror surfaces 56, 58 are supported in recess 54 in any suitable manner such as by adhesive attachment or the like and the angle bisector thereof lies along the centerline of surface 50. This mirror positionment is best shown in FIGS. 3 and 4 wherein it will be seen that the non-recording surface 60 of tape 16 is led across rounded surfaces 52 and planar surface 50 to overlie mirror surfaces 56, 58 which are, each, related thereto at 45°. Thus, indicia 62 applied to the non-recording surface 60 of tape 16 may be observed from either side of cartridge 10 through one of the opposed viewing openings 64 in the associated one of the mirror surfaces as indicated by the line of sight arrows 66. With reference to the indicated indicia 62 illustrated in FIG. 1, it will be understood that the third indicated selection is for that track on the particular "side" of the cartridge being played and that the observable indicia markings with the cartridge in the position shown are all applied on one half width of the tape at the pause intervals between recorded selections. The pause intervals between the recorded selections on the other track are denoted by indicia applied to the other half tape width and are observable through the viewing opening on the other side of the cartridge.

Although indicia 62 have been schematically illustrated as represented by the numeral 3, it will be understood that if such numerical cue markings are used there will be a plurality of such markings along the particular pause interval indicated by the numeral 3 which would indicate the pause interval immediately preceding the third selection on side A of the cartridge. If there were, for example, six selections on side A and eight selections on side B then the indicial markings on the other half tape width from that exposed in FIG. 1 would include the indicia from 7 to 14 with each indicial marking being repeated a plurality of times within its own pause interval.

A particularly advantageous form of indicial marking which precludes any necessity for recognizing particular numerals when the tape is being transported at high speed includes the use of closely spaced parallel lines at each pause interval. The lines in each interval may be of one color which is different from the line colors in other pause intervals thus establishing a color code which is correlated with a particular selection.

In operation, and as a last assembly stage, tape 16 is drawn from the fully wound pay-out reel 12, looped around pulleys 18, led across the top of reel 14 and threaded through opening 40 in the mirror containing guide structure 20 with the non-recording surface 60 facing mirror surfaces 56, 58 prior to the securement of the tape end to take-up reel 14. Thereafter, the previously recorded surface 24 of tape 16 may be played in the usual manner with guide structure 20 being moved to the left, as viewed in FIG. 1, as the tape is wound on reel 14. It will be noted that guide structure 20 is, in effect, captivated by the tape passing through opening 40 since the winding tension exerted thereby holds guide structure 20 lightly against the periphery of the wound tape on reel 14. Thus, as the diameter of the tape on reel 14 increases, the guide structure is moved to the left and, upon rewind, this direction of movement is reversed. The total range of movement undergone by guide structure 20 underlies the conventional viewing opening 64 so that the upper half of the non-recording tape surface 60, as viewed in FIG. 1, is always visible in mirror surface 56. If it be desired to skip the first two selections and play the third, the conventional high forward speed control is used to advance the tape until a series of the numerals 3 flash across mirror surface 56 which indicates the pause interval just ahead of the third selection. At this time, the normal playing speed control is energized to play the selection. Similar selections may be made on the other track by reversing the cartridge and viewing the cue markings reflected from mirror surface 58.

The foregoing discussion has been directed to pre-recorded tapes wherein the original cue markings are correlated with the original recordings and when these original recordings are erased, subsequently recorded selections may or may not correspond with the originally applied cue markings. In the latter event, the conventional index markings 68 may be used to estimate selection positions as has been the previous practice.

In the case of non-recorded tape sales, i.e., where the magnetic tape cartridge is sold for recording by the purchaser; the cue markings are desirably spaced at predetermined selected intervals, such as 1 minute intervals for example, and the user may then keep his own memoranda as to the positionment of the pause intervals along the tape length in relation to the prepositioned cue markings.

I claim:

1. In combination with indicia bearing reelable web means mounted for transport between selectively driven reels supported within a housing containing a viewing opening past which said web is transported; mirror means adjacent said web means for reflecting said indicia through said opening, means mounting said mirror means intermediate said reels; said viewing opening exposing one side of said mirror means; and said indicia bearing web means comprising a recordable web having a recording surface and an opposed non-recording surface bearing said indicia.

2. The combination of claim 1 including web guiding means for defining a path of web transport between said reels, said web guiding means including the mirror mounting means, and said one side of said mirror means being positioned on said mirror mounting means for defining an optical path between the non-recording surface of said web and said viewing opening whereby the indicia bearing non-recording surface of said web may be viewed through said opening.

3. The combination of claim 2 wherein said housing contains a second viewing opening exposing the other side of said mirror means, and said other side of said mirror means being positioned on said mirror mounting means for defining an optical path between the non-recording surface of said web and said second viewing opening whereby the non-recording surface of said web may be viewed through either of said viewing openings.

4. The combination of claim 3 wherein both sides of said mirror means include a mirror surface positioned at substantially 45° to the plane of said web passing over the mirror mounting means portion of the web guiding means.

5. The combination of claim 4 wherein the mirror surfaces of said mirror means converge in the direction of said web passing over the mirror mounting means, and a bisector of the angle defined by said mirror surfaces lies substantially along the longitudinal axis of said web passing over the mirror mounting means whereby opposite halves of the non-recording surface of said web may be viewed through said viewing openings in opposite ones of said mirror surfaces.

6. The combination of claim 5 including means supporting said mirror mounting means for back and forth movement intermediate said reels.

7. The combination of claim 6 wherein said mirror mounting means includes a web threadable opening in optical communication with said mirror means, said web being threaded through said opening with the non-recording surface thereof in optical communication with said mirror means whereby said mirror mounting means may undergo said back and forth movement as a consequence of the web transport between the reels while the indicia bearing unrecording web surface is constantly reflected through both viewing openings.

8. The combination of claim 7 wherein said housing comprises a tape cartridge, said web comprises a magnetic tape and said indicia comprise cue markings positioned intermediate recorded portions of said tape.

9. A tape cartridge, comprising; a generally rectangular housing having viewing openings in opposite sides thereof, a pair of selectively driven reels mounted within said housing for the selective transport of magnetic tape therebetween, tape guide means within said housing defining a path of tape transport between said reels, at least one of said guide means being positioned between said viewing openings whereby the same may be viewed from either side of the cartridge, and said one guide means including mirror means defining optical paths between the tape transport path and said viewing openings.

10. The tape cartridge of claim 9 including means mounting said mirror means for back and forth movement intermediate said reels whereby said mirror means may follow the varying effective diameter of at least one of said reels as tape is transported between the reels.

11. The tape cartridge of claim 10 wherein said one guide means includes an opening therein surrounding said tape transport path whereby said back and forth movement may be effected by the transport of tape along said tape transport path.

* * * * *